Oct. 16, 1962 T. H. WIANCKO ET AL 3,059,125

GATING SYSTEM EMPLOYING A DIODE BRIDGE LOGIC CIRCUIT

Filed Nov. 12, 1958 2 Sheets-Sheet 1

THOMAS H. WIANCKO
ROBERT K. BUNCE
INVENTORS

BY [signature]

ATTORNEY

THOMAS H. WIANCKO
ROBERT K. BUNCE
INVENTORS

BY Reed C. Lawlor
ATTORNEY

3,059,125
GATING SYSTEM EMPLOYING A DIODE BRIDGE LOGIC CIRCUIT

Thomas H. Wiancko, Altadena, and Robert K. Bunce, San Gabriel, Calif., assignors, by mesne assignments, to Tamar Electronics, Inc., Gardena, Calif., a corporation of California Filed Nov. 12, 1958, Ser. No. 773,358
9 Claims. (Cl. 307—88.5)

This invention relates to improvements in electronic circuits and more particularly to improvements in electronic gates and circuits that employ a plurality of electronic gates.

In many electronic systems, it is desirable to employ electronic gates that transmit signals from corresponding signal sources to one or more corresponding signal receivers only when predetermined sets of control signals are applied thereto. This invention relates especially to improvements in gates that may be employed to transmit continuously variable signals with little distortion. Furthermore, this invention also relates to a gating system in which a plurality of gates is employed to interconnect a plurality of circuits, such as a plurality of signal sources that are successively connected to a common circuit such as a signal receiver by means of an electronic commutator. By the use of a plurality of electronic gates of this invention in such a system, signals may be transmitted through the system one at a time with very little cross-talk.

The gate of this invention, though very simple, is very reliable and relatively inexpensive considering the results attainable with it. In the best form of the gate now known, capable of use under a wide variety of conditions, the gate comprises four transfer diodes which are arranged in a bridge for either transmitting or cutting off the transmission of signals in a communication channel that interconnects a signal source and a signal receiver. In addition, the gate employs a plurality of control diodes that act in cooperation with control units to open the gate under one predetermined set of conditions of the control units and to maintain the gate closed under any other set of conditions of the control units. The gate is particularly applicable for use in a matrix which is employed for switching various channels of a communication system, especially one in which a plurality of communication units of one kind is to be connected one at a time to a common communication unit of another kind.

Figure 1:
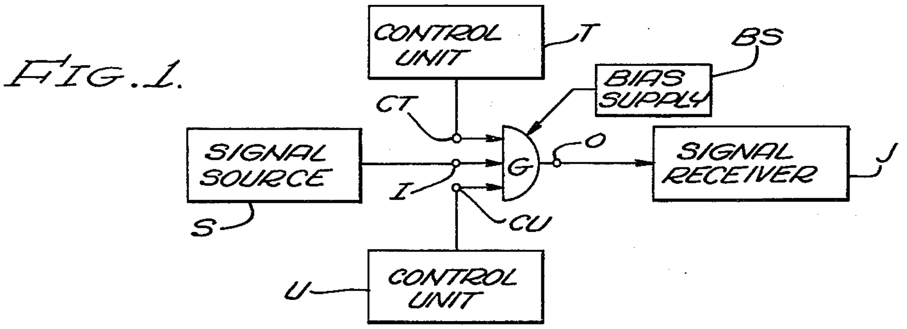
Figure 2:
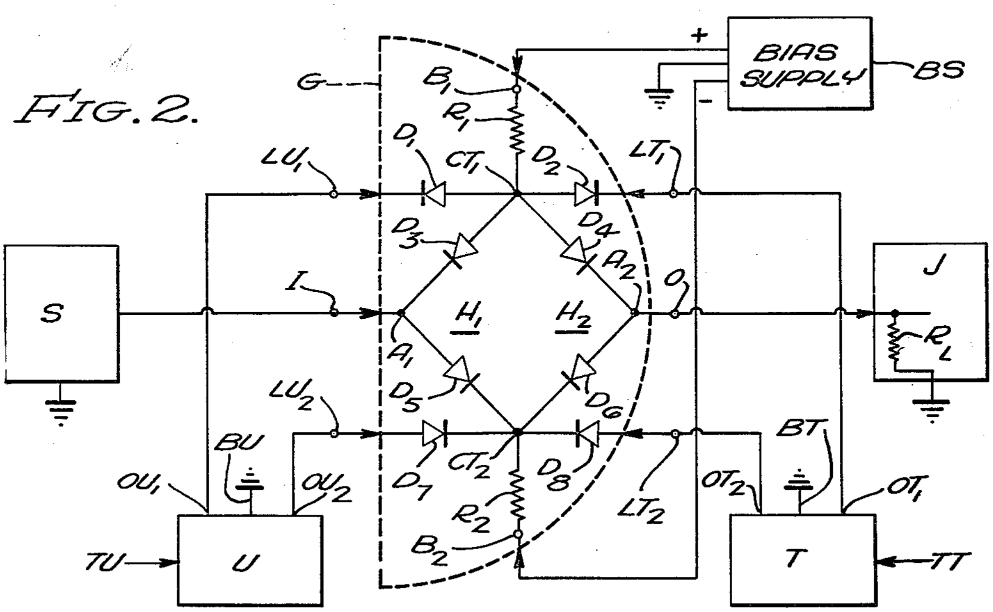
Figure 5:
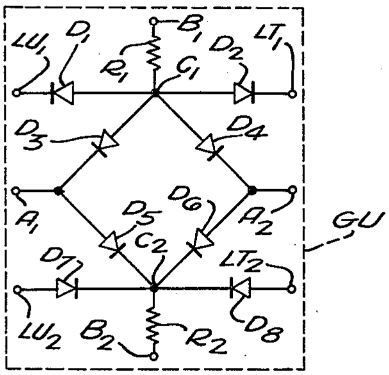
Figure 6:
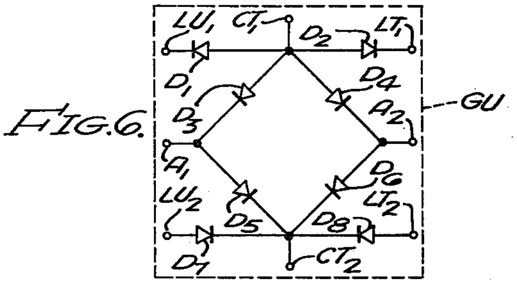
Figure 4:
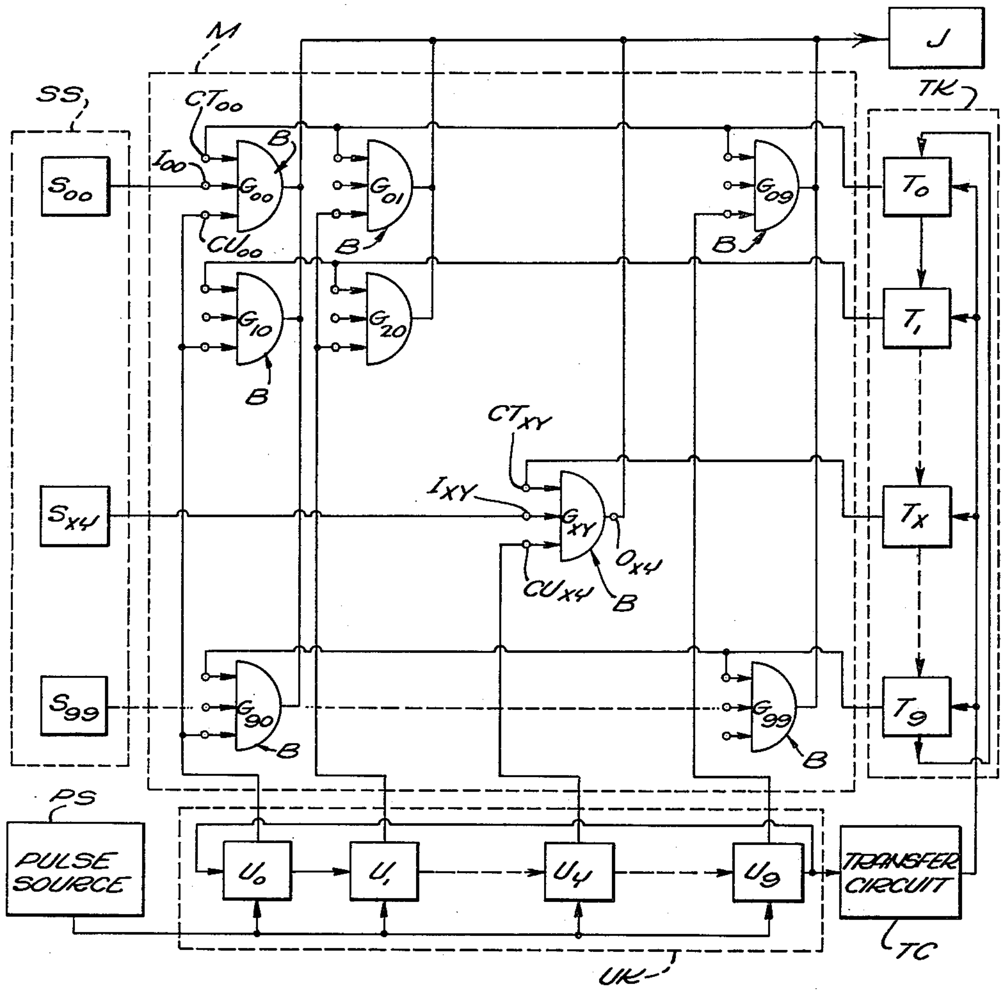
Figure 3:
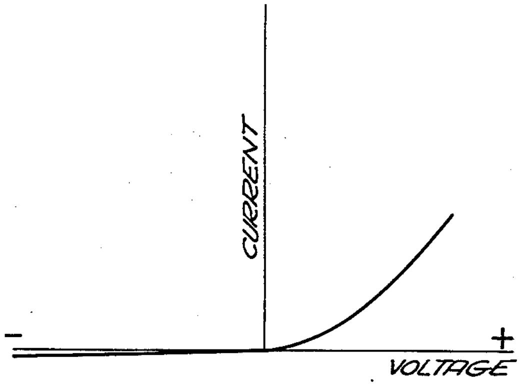

The invention is described herein with reference to the following drawings:

FIGURE 1 which is a simplified diagram of an electronic gate that embodies this invention together with associated equipment;

FIG. 2 which is another diagram of the same parts illustrated in FIG. 1 but showing details of the gate;

FIG. 3 which is a graph employed in explaining the operation of the invention;

FIG. 4 which is a block diagram of a commutating system to which the invention has been applied; and FIGS. 5 and 6 which are schematic diagrams of gate units embodying this invention.

Referring to FIGS. 1 and 2, there is illustrated a signal transfer "and" gate that incorporates various features of this invention and which is employed in many forms of this invention. The "and" gate G is employed to control the transmission of signals from a signal source or transmitter unit S to a signal receiver or utilization unit J when gate-opening signals are applied thereto from both of the control units U and T, but is closed when a gate-closing signal is applied thereto by either of the control units U or T or by both of them. When the gate G is open, signal voltages supplied from a signal source S are transmitted through the gate to a signal receiver J.

The signal supplied by the signal source is in the form of an electrical voltage that varies as a function of time. This voltage may vary continuously as a function of time or it may even be in the form of a series of square-wave pulses. In any event, the signal source supplies a time-variable signal voltage which has an amplitude that varies within a predetermined range. For purposes of illustration, it will be assumed hereinafter that the signal voltage supplied by the signal source lies in a range between +5 volts and −5 volts.

In the specified form of the invention illustrated in FIG. 1, each of the control units U and T is in the form of a balanced square-wave voltage generator that produces at its output a polarity reversible voltage that is symmetrical with respect to ground. More particularly, the control unit U has a pair of output terminals $OU_1$ and $OU_2$ and a ground terminal BU. Likewise, the control unit T has a pair of output terminals $OT_1$ and $OT_2$ and a ground terminal BT. Each of the control units U and T produces voltages at its output terminals which are of opposite sign relative to ground. For purposes of illustration, it will be assumed that the voltage across the output of each half of each control unit is 8 volts. For reasons which will become apparent hereinafter, the control units are designed to have very low output resistances.

Each of the control units U and T is arranged to respond to trigger pulses TU and TT, as the case may be, applied to its input to reverse the polarity of the voltages at its output terminals. For convenience, the control signal that is applied to the gate G by the control unit U, will be called positive when the control voltage at the output terminal $OU_1$ is positive and the control voltage at the output terminal $OU_2$ is negative. Likewise, the control signal that is applied to the gate G by the control unit T, will be called positive when the control voltage at the output terminal $OT_1$ is positive and the control voltage at the output terminal $OT_2$ is negative. Each of the foregoing control voltages is a gate-opening voltage. But the control signal that is applied to the gate G by the control unit U, will be called negative when the control voltage at the output terminal $OU_1$ is negative and the control voltage at the output terminal $OU_2$ is positive. Similarly, the control signal that is applied to the gate G by the control unit T, will be called negative when the control voltage at the output terminal $OT_1$ is negative and the control voltage at the output terminal $OT_2$ is positive. Each of the latter control voltages is a gate-closing voltage. Since control units that produce such symmetrical control voltages of reversible polarity at their output and which respond to trigger pulses applied to their input to reverse the sign of the control voltage are well known in the art, it is not necessary to describe such a control unit in detail here.

The gate G, while very simple, is composed of a novel arrangement of eight diodes $D_1$, $D_2$, . . . $D_7$ and $D_8$ that cooperate to transmit signals from the signal source S to the signal receiver J when the control voltages supplied by both control units U and T are positive and to prevent the transmission of such signals when the control voltage supplied by one or more of the control units U and T is negative.

More particularly, the gate G includes four gate controls diodes $D_1$, $D_2$, $D_7$ and $D_8$ and four transfer diodes $D_3$, $D_4$, $D_5$ and $D_6$. The latter diodes, namely, the four transfer diodes, are arranged as a quadrilateral bridge that has a pair of diagonally opposite main control junctions $CT_1$ and $CT_2$, and a pair of diagonally opposite transfer junctions $A_1$ and $A_2$. The first transfer junction $A_1$ is connected to a terminal at the input point I to which signals from the signal source S are applied. The second transfer junction $A_2$ is connected to an output terminal O from which signals are applied to the signal receiver J. A source of bias voltage such as 200 volts that is symmetrical with respect to ground, is connected across bias supply terminals $B_1$ and $B_2$ which are respectively connected through resistors $R_1$ and $R_2$ to the main control junctions $CT_1$ and $CT_2$. The bias supply BS supplies a positive voltage of +100 volts to the positive bias terminal $B_1$ and an equal but opposite voltage of −100 volts to the negative bias terminal $B_2$. The diode $D_1$ is forwardly connected between the main control junction $CT_1$ and an upper control terminal $LU_1$. The diode $D_2$ is forwardly connected between the main control junction $CT_1$ and the upper control terminal $LT_1$. The diode $D_7$ is backwardly connected between the main control junction $CT_2$ and a lower control terminal $LU_2$. The diode $D_8$ is backwardly connected between the main control junction $CT_2$ and a lower control terminal $LT_2$.

The transfer diode $D_3$ is connected in a forward direction in one arm of the bridge between the positive control junction $CT_1$ and the input transfer junction $A_1$. The transfer diode $D_5$ is connected in a forward direction in a second arm of the bridge between the input transfer junction $A_1$ and the negative control junction $CT_2$. The transfer diode $D_4$ is connected in a forward direction in a third arm of the bridge between the master control junction $CT_1$ and the output transfer junction $A_2$. The transfer diode $D_6$ is connected in a forward direction between the negative control junction $A_2$ and the output transfer junction $A_2$.

It will be noted that in the gate G described above, the two diodes $D_3$ and $D_5$ that are connected to the input transfer terminal $A_1$ are both connected in a forward direction in the input branch $H_1$ of the bridge between the positive control junction $CT_1$ and the negative control junction $CT_2$. The two diodes $D_4$ and $D_6$ that are likewise connected to the output transfer junction $A_2$ are both connected in a forward direction in the output branch of the bridge between the control junctions $CT_1$ and $CT_2$. Accordingly, when the voltage differential across the two main control junctions $CT_1$ and $CT_2$ is positive, current flows through the transfer diodes in both branches $H_1$ and $H_2$. However, when the voltage differential across the main control terminals $CT_1$ and $CT_2$ is negative, no current flows through the diodes in either branch $H_1$ or $H_2$.

In order to close the gate G to prevent the transmission of signals from the signal source S to the signal receiver J, the voltage of the control signals applied from the control units U and T is negative and greater than the maximum amplitude of signals appearing in the output of the signal source S. In order to open the gate to transmit signals therethrough from the signal source S to the signal receiver J, the signal control voltage supplied by the control units U and T is made positive and greater than the amplitude of any signal voltage appearing in the output of the signal source S. More particularly, when the maximum amplitude of the signal appearing in the output of signal source S is below 5 volts, the voltage supplied across each half of the output of each control unit U and T is more than 5 volts, being, for example, 8 volts. In order that the signals may be transmitted efficiently and with little distortion through the gate G, the bias voltage applied across the bias terminals $B_1$ and $B_2$ is made very large compared with the control voltage supplied by the control units U and T.

In order to understand the operation of the invention, the action of a diode in response to a backward voltage or a forward voltage, should be borne in mind. In FIG. 3 there is illustrated a graph that indicates how the current flowing through a diode is related to the voltage across the diode. When the voltage is positive in this graph, the current is high in a forward direction, but when it is negative, it is low in a backward direction. The forward direction of the diode is the direction in which high currents flow from the anode end to the cathode end of the diode, while the backward direction is the direction in which low currents flow from the cathode end to the anode end of the diode. Though some diodes have characteristics somewhat different from that illustrated in FIG. 3, the general principles of operation of the gate are, nevertheless, the same as for a diode having such a characteristic. The forward, or front, resistance of the diode is low and the backward, or back, resistance of the diode is high. A typical diode with such a characteristic is a silicon diode of the type that is designated by the trade symbol 1N300. The front-to-back ratio of currents for such diodes is about 5,000,000 for any substantial voltage such as 1 volt applied across its ends. Gates employing such diodes have proved very satisfactory.

Consider first the action of the gate when a positive control voltage is applied by all control-voltage sources. Under these circumstances, a positive voltage of +8 volts is applied from the output terminal $OU_1$ of the control unit U to the upper input terminal $LU_1$ of the gate and a negative voltage of −8 volts is applied from the other output terminal $OU_2$ to the lower control terminal $LU_2$ of the gate. A positive voltage of +8 volts is also applied from the output terminal $OT_1$ of the control unit T to the upper input terminal $LT_1$ of the gate and a negative voltage of −8 volts is applied from the other output terminal $OT_2$ to the lower control terminal $LT_2$ of the gate. The potential at the main control junction $CT_1$ cannot exceed +8 volts, and the potential at the lower main control junction $CT_2$ cannot be less than −8 volts. Under these conditions, current from the bias supply BS flows in the forward conducting direction through the transfer diode $D_3$, $D_5$ and $D_4$, $D_6$ in the respective branches $H_1$ and $H_2$ of the bridge circuit. Due to the relatively low voltage drop across these forward-conducting transfer diodes and the voltage divider action of the resistors $R_1$ and $R_2$, as is described in more detail hereinafter, the control terminals $CT_1$ and $CT_2$ are relatively close to ground potential. But for this very reason the control diodes are back-biased with respect to the voltages applied to the input terminals $LU_1$, $LU_2$, $LT_1$ and $LT_2$ and hence conduct very little current.

The output terminals $OU_1$ and $OU_2$ of the first control unit U, are connected respectively to the pair of control terminals $LU_1$ and $LU_2$ at the control point CU of the gate G. Similarly, the output terminals $OT_1$ and $OT_2$ of the first control unit T, are connected respectively to the pair of control terminals $LT_1$ and $LT_2$ of the control point CT of the gate G.

An explanation of what occurs in the bridge circuit when voltages are applied from the signal source S to the bridge can be obtained by considering the effects produced by a change in input voltage in a step-by-step manner. Initially, the positive control terminal $CT_1$ is slightly positive and the negative control terminal is slightly negative with respect to ground. At this time the voltage at each of the upper control terminals $LU_1$ and $LT_1$ is +8 volts, and the voltage at each of the lower control terminals $LU_2$ and $LT_2$ is −8 volts. All of the control diodes $D_1$, $D_2$, $D_7$ and $D_8$ are thus back-biased at this time, drawing little current, and all of the transfer diodes are front-biased, drawing a large positive current. Under these circumstances when the applied signal voltage is increased by a small amount in a positive direction, the voltage across the upper diode $D_3$ in the input branch $H_1$ decreases, thereby causing its resistance to increase. Simultaneously, the voltage across the lower diode $D_5$ in the input branch $H_1$ increases, causing its resistance to decrease. Since the diodes are conducting, the two resistance changes are about equal. For this reason and because the resistance values of the four transfer diodes $D_3$, $D_4$, $D_5$ and $D_6$ are all very small compared with the resistance values of the bias resistors $R_1$ and $R_2$, there is substantially no change in the amount of current flowing from the bias source BS through each of the two branches $H_1$ and $H_2$ of the bridge. But the voltage applied across the lower diode $D_5$ by the signal source S causes an additional current to flow in the forward direction through the diode $D_5$ and through the resistor $R_2$. The additional current through the resistor $R_2$ causes the voltage across this resistor $R_2$ to increase, thereby driving the voltage of the lower main control terminal $CT_2$ in a positive direction. As a result of this action, the voltage across the diode $D_6$ is decreased, causing an increase in the resistance of this diode. Because of the latter increase in resistance, the voltage across the diode $D_6$ increases. In other words, as the voltage of the lower control junction $CT_2$ is raised by the current flowing from the signal source, the voltages of the upper control junction and the output transfer junction are lifted.

As a result of the foregoing action, when any positive voltage is applied to the input transfer terminal $A_1$, a very nearly equal positive voltage appears at the output transfer terminal $A_2$. Simultaneously, the voltage of the upper main control junction $CT_1$ increases. Unless this occurs, the upper transfer diodes $D_3$ and $D_4$ would become back-biased and no current would flow through them from the bias source. But this cannot happen under the conditions described because if no current flowed through the upper transfer diodes $D_3$ and $D_4$, there would be no voltage drop across the upper bias resistor $R_1$ and the positive bias voltage of +100 volts would appear at the positive main control junction $CT_1$, thus forward-biasing these diodes and causing them to draw current.

So long as the amplitude of the voltage applied from the signal source S is less than +8 volts, the control diodes $D_1$, $D_2$, $D_7$ and $D_8$ remain back-biased (recall the control junctions $CT_1$ and $CT_2$ operate relatively close to ground potential) and hence draw no current. By similar reasoning, it can be shown that when a negative voltage is applied to the input I, a nearly equal negative voltage appears at the output O so long as the magnitude of the negative signal voltage is less than about 8 volts.

It is therefore apparent from the foregoing explanation that when the gate G is open, voltages that lie within a predetermined range and which are applied to the input I of the gate G, are accurately reproduced in the output O of the gate and are applied to the signal receiver J. In practice, the maximum voltage which can be faithfully reproduced at the input of the signal receiver J depends upon the input resistance $R_L$. For example, if the voltage supplied across the two terminals $B_1$ and $B_2$ by the bias supply BS, $2V_B$, then the maximum voltage that can appear cross the input resistance $R_L$ of the signal receiver J is given by the formula $$V_{max.}=\frac{V_B R_L}{R+R_L}$$

In this equation, it is assumed that the resistances of the transfer diodes $D_4$ and $D_6$ in the output branch $H_2$ are negligible when the bridge is in conducting condition and that the resistances of the two bias resistors is the same, namely, R. Thus, for example, to transmit signals that may have an amplitude as high as 5 volts through the gate G, when the value of each bias resistor is 800,000 ohms and the bias voltage is 200 volts, the input resistance $R_L$ of the signals receiver unit J must exceed about 40,000 ohms.

Next consider the action of the gate G when a negative control voltage is applied by one of the control units U or T and a positive control voltage is applied by the other. For example, assume that a negative control voltage is applied by the first control unit U and a positive voltage is applied by the second control unit T. Under these circumstances, a voltage of −8 volts is applied to the control terminal $LU_1$ and a voltage of +8 volts is applied to the control terminal $LU_2$. As a result, forward voltages are applied across both of the diodes $D_1$ and $D_7$, causing these diodes to draw current. As a result of the fact that the two diodes $D_1$ and $D_7$ have very low resistances compared with the resistances of the bias resistors $R_1$ and $R_2$ and the further fact that the output resistance of the control unit U is small, very little voltage appears across the two control terminals $CT_1$ and $CT_2$. Under these circumstances, the positive voltage applied from the second control unit T to the control terminal $LT_1$ and the negative voltage applied by the control unit to the control $LT_2$ are in such direction that the voltage across each of the gate control diodes $D_2$ and $D_8$ is in a backward direction. For this reason, these diodes draw substantially no current. The short circuit created by the forward bias on the two control diodes $D_1$ and $D_7$, in effect, maintain the gate closed.

With the negative potential supplied to the gate by the first control unit U as described above and a positive control voltage applied to the gate G from the second control unit T, regardless of the voltage applied to the input junction $A_1$, the voltage at the output junction $A_2$ cannot change substantially. Under these circumstances, as explained above, the potential of the terminal $CT_1$ is −8 volts, and the potential of the terminal $CT_2$ is about +8 volts. For this reason, regardless of the voltage applied to the input junction $A_1$, no substantial change can appear in the potential at the output terminal O. Furthermore, the potential at the output terminal lies between the potentials of the two terminals $CT_1$ and $CT_2$ and is substantially equal to ground potential when the reverse resistances of the two diodes $D_4$ and $D_6$ are substantially equal. Similarly, with a negative potential supplied to the gate by the second control unit T as described and a positive control voltage applied to the gate G from the first control unit U, regardless of the voltage applied to the input junction $A_1$, the voltage at the output junction $A_2$ cannot change substantially. Likewise, when negative control signals are applied by both of the control units U and T to the gate G, the gate G is closed and no signal can be transferred through it from the signal source to the signal receiver J.

It is interesting to note that if the amplitude of a positive signal voltage applied by the signal source exceeds the control voltage while the gate is open, current flows through the upper gate control diodes $D_1$ and $D_2$ to the control units when the input signal is positive, thus preventing the voltage appearing at the output transfer terminal $A_2$ from exceeding the control voltage. Likewise, if the amplitude of a negative signal voltage applied by the signal source exceeds the control voltage while the gate is open, current flows through the lower gate control diodes $D_5$ and $D_6$ to the control units, thus preventing the voltage appearing in the output transfer terminal $A_2$ from exceeding the control voltage.

In the specific embodiment of the invention described above, the action of the gate has been explained by reference to a system which employs two control units U and T. However, it will now readily be understood by those skilled in the art that the addition of another control unit and another corresponding pair of gate control diodes will result in similar operation. Accordingly, in such an arrangement, generally speaking, the gate is open only when all of the control units apply relatively positive voltage differentials, or gate-opening signals, to their corresponding control points, and the gate is closed if any of the control units applies a negative voltage differential, or gate-closing signal, to its corresponding control point.

Gate units of the type described above may be employed effectively wherever it is desirable to utilize gates which are subject to the control of a plurality of control units.

In FIG. 4 there is illustrated a commutator which employs a matrix of gates of the type described above. The matrix illustrated in this figure is employed to commutate signals supplied from a plurality of signal sources so as to apply these signals one at a time to a common signal receiver. By way of illustration, the invention is here illustrated as being applicable to a square centimal matrix in which one hundred gages G are arranged in a square matrix, having ten rows and ten columns, and the matrix is commutated by means of two decimal ring circuit units $UK_1$ and $UK_2$ associated with two mutually perpendicular edges of the matrix. With this arrangement, trigger signals from a pulse source PS actuate two interconnected ring circuits $K_1$ and $K_2$ to cause the gates of the matrix to open one at a time in order to transmit signals from a corresponding set of signal sources to the common receiver.

In FIG. 4, the same symbols are employed as hereinabove to identify gates, control units, and parts thereof. But subscripts are added to separately identify the individual units. More particularly, a typical gate of the matrix is represented by the symbol $G_{xy}$, where $x$ is a digit that represents the number of the row in which the gate is located and $y$ is a digit that represents the number of the column in which the gate is located. Each of the subscript digits can have any value from 0 to 9.

Each gate $G_{xy}$ is provided with two control points, a first control point $CU_{xy}$ and a second control point $CT_{xy}$. Each gate is also provided with a signal input point $I_{xy}$ and a signal output point $O_{xy}$. All of the output points of the hundred gates are connected together and to the input of the single signal receiver unit J. The input $I_{xy}$ of each gate $G_{xy}$ is connected to the output of a corresponding signal source $S_{xy}$ of a set SS of a hundred signal sources. Commutation is accomplished by supplying control signals to the control input point $CU_{xy}$ and $CT_{xy}$ as explained below.

The numbers $x$ which are employed to designate the columns increase from left to right in the matrix and the numbers $y$ of the rows increase from top to bottom in the matrix. A "units" ring counter $U_K$ is associated with the lower edge of the matrix and a "tens" ring counter $T_K$ is associated with the right edge of the matrix.

The "units" ring counter $U_K$ includes ten control units $U_0, \ldots U_y, \ldots, U_9$ connected together in sequence in a ring. Each of the control units of the "units" ring counter $U_K$ is a control unit of the same type hereinbefore described which supplies either a positive or a negative control voltage at its output, balanced with respect to ground. The control units $U_0, \ldots U_y, \ldots, U_9$ are so arranged that only one control unit at a time can provide a positive control signal at its output, while all the remaining control units provide negative control signals at their outputs.

A pulse source PS that supplies a train of clock pulses is connected to the inputs of all of the "units" control units. With such an arrangement, a positive control voltage appears at the outputs of the respective units control units, one at a time, in sequence, recycling after ten pulses have been applied to their inputs.

Each of the control units of the "tens" ring counter $U_K$ is also a control unit of the same type hereinbefore described which supplies either a positive or a negative control voltage at its output, balanced with respect to ground. The control units $T_0, \ldots T_x, \ldots, T_9$ are so arranged that only one "tens" control unit T at a time can provide a positive control signal at its output, while all the remaining control units provide negative control signals at their outputs.

With such an arrangement, a positive control voltage also appears at the outputs of the respective control units, one at a time, in sequence, recycling after ten pulses have been applied to their inputs.

A transfer circuit $U_U$ connected to the output of the "units" control unit $U_9$ is employed to supply a series of clock pulses to the inputs of the "tens" control units $T_1 \ldots T_9$.

The output of each of the "units" control unit $U_y$ is connected to the lower control point $CU_{xy}$ of all of the gates in the $y$ column. The output of each of the "tens" control unit $T_x$ is connected to the upper control point $CT_{xy}$ of all of the gates in the $x$ row.

With the commutation system described above, only one gate is open at a time. This is the gate to which positive control signals are applied to its two control points by a "units" control unit and by a "tens" control unit, respectively. Thus, for example, when a positive control signal is applied by the units control unit $U_y$ to the lower control input $CU_{xy}$ of the gate $G_{xy}$ and when a positive control signal is applied by the units control unit $T_x$ to the lower control input $CT_{xy}$ of the gate $G_{xy}$ is open but if either one or both of these control voltages is negative, the gate $G_{xy}$ is closed.

In order to facilitate an understanding of the operation of the commutator, assume that in an initial condition the "units" control unit $U_0$ supplies a positive voltage to all of the gates $G_{00}, G_{10}, \ldots G_{90}$ in the first column and that the "tens" control unit $T_0$ applies a positive control voltage to all of the gates $G_{00}, G_{01}, \ldots G_{09}$ in the first row, and that all of the remaining "units" control units $U_2 \ldots U_9$ and "tens" control units $T_1 \ldots T_9$ supply negative control voltages to the gates in their corresponding rows and columns. Under these circumstances, the only gate that is open is the gate $G_{00}$, all the rest of the gates being closed. When the next pulse is applied from the pulse source PS, the control voltage supplied by the "units" control unit $U_0$ changes from positive to negative, and the control voltage supplied by the next "units" control unit $U_1$ changes from negative to positive. This action results in closing the gate $G_{00}$ and opening the gate $G_{01}$. In a similar way, the next pulse closes gate $G_{01}$ and opens gate $G_{02}$. Successive pulses open all of the gates in the first row successively one at a time in numerical order of their subscripts, until gate $G_{09}$ has been opened. When the next pulse is applied, the control voltage supplied by the "units" control unit $U_9$ becomes negative and the control voltage supplied by the "units" control unit $U_0$ becomes positive. The system is arranged in a manner well known to those skilled in the art so that when the voltage supplied by the "units" control unit $U_9$ changes from its positive value to its negative value, a pulse is transmitted through a transfer circuit TC to the inputs of all of the "tens" control units $T_0 \ldots T_9$. This pulse causes the control voltage of the "tens" control unit $T_0$ to become negative and the control voltage supplied by the "tens" control unit $T_1$ to become positive. Upon the completion of these changes, a positive control voltage is supplied to all of the gates in the "0" column and in the "1" row, causing the gate $G_{10}$ to open and all of the other gates to be closed. This operation continues, in effect scanning the rows from left to right one at a time beginning from the top of the matrix and finishing at the bottom of the matrix. At the completion of this single sequence for the matrix, the control units $U_9$ and $T_9$ are providing positive control voltages to the gate $G_{99}$. When the next pulse is applied from the source PS, these control voltages become negative and the control voltages supplied by the "units" control voltage source $U_0$ and the "tens" control voltage source $T_0$ become positive. As a result, gate $G_{99}$ is closed and gate $G_{00}$ reopens and the complete scanning of the matrix is commenced again.

As each gate $G_{xy}$ is opened in sequence, the signal from the corresponding signal source $S_{xy}$ is transmitted to the signal receiver J. By using a gate of the type described above, the commutation of signals can be accomplished with very little cross-talk between channels, and commutation may be accomplished at a very rapid rate. In practice, voltage supplied by the bias supply BS and the values of the resistors $R_1$ and $R_2$ are so selected in relationship to the characteristics of the diodes that the maximum signal that can appear in the output transfer terminal $A_2$ of any gate is smaller than the error that is permitted in the reproduction of the signals transmitted through the gates.

With the gate specifically described above, it is possible to attenuate an input voltage of 5 volts by a factor of one million when the gate is closed, so that a signal of only 5 microvolts appears in the output. For this reason, it is possible to commutate signals applied to the input of the gates with very little cross-talk over a very wide range of signal amplitudes.

In the foregoing description of the invention, special attention has been given to the application of the invention to a system in which voltages that vary as continuous functions of time are to be reproduced. For this purpose, gates which are substantially free of distortion are provided by employing four transfer diodes in the four arms of the quadrilateral bridge forming the gate. It is to be understood, however, that if distortion-free reproduction is not required, one or more of the diodes may be replaced by fixed resistors.

In practice, the gates G are manufactured in the form of separately salable units. One form of such a gate unit is illustrated in FIG. 5. In this gate unit GU, the terminals $LU_1$, $LU_2$, $LT_1$ and $LT_2$, $A_1$, $A_2$, $B_1$, and $B_2$ are actually in the form of prongs or lugs to which electrical connections may be readily made and the resistors $R_1$ and $R_2$ and the diodes $D_1 \ldots D_8$ are connected to these terminals in the same way as they are in FIG. 2. In this case, the control terminals $C_1$ and $C_2$ are merely junctions between the circuit elements. In the form of the unit illustrated in FIG. 5, however, the bias terminals $B_1$ and $B_2$ and the bias resistors $R_1$ and $R_2$ are omitted and are replaced by control terminals $C_1$ and $C_2$. In both FIG. 4 and FIG. 5, the various elements and their associate terminals are mounted in common housings or on common bases to facilitate their being connected in various parts of a matrix and to facilitate their being easily replaced.

Though only a specific application of this invention to a commutator has been described hereinabove, it will be understood that the invention is not limited thereto but that it is applicable to other circuits in which a plurality of gates is employed to connect a plurality of communication units of one kind (either a source or a receiver) to the corresponding transfer points on one branch of the respective gate bridges and another type of communication unit (either a receiver or a source) to the corresponding transfer points on the branch of the respective gate bridges. In the commutator illustrated, a plurality of signal sources are connected to the respective inputs of the gates and a single signal receiver is connected to the outputs of all of the gates. However, the invention may also be applied to decommutate signals by connecting a single signal source to the inputs of all of the gates and corresponding separate signal receivers to the outputs of the gates. Such a decommutator would be produced, for example, by utilizing for the unit J at FIG. 4 a signal source which produces a sequence of signals and by utilizing as the units $S_{xy}$ signal receivers to which the various segregated signals are to be transmitted. In such a case, the pulse source PS is interconnected with the signal source J to provide the desired decommutation. Likewise, of course, the invention may be employed by use of other multiple sources of control signals than ring circuits.

Furthermore, though the invention has been described with reference to a system that is balanced symmetrically with respect to ground, it is also applicable to asymmetrical systems. In such systems, the control voltages are not symmetrical with respect to ground but the voltage differences appearing across the outputs of the control voltage units are of reversible polarity and are so applied as opening or closing the gates.

From the foregoing explanation, it is thus clear that this invention provides a versatile reliable distortion free gate which may be employed under a wide variety of conditions where distortion-free reproduction of continuously variable signals is desired and which may be employed in units which handle many different signals which are to be selectively gated with little cross-talk. In will be understood of course that the invention may be modified in many ways without departing from the principles set forth herein, and more particularly that other types of unilateral resistance elements than diodes may sometimes be employed, and that diodes of other types than those described may be employed, and that various other modifications may be made without departing from the scope of the invention as defined by the following claims.

The invention claimed is:

1. An electronic gate including:

a quadrilateral bridge having a pair of diagonally opposite main control junctions, one main control junction being positive and the other negative and having a pair of diagonally opposite transfer junctions, one transfer junction being an input junction and the other transfer junction being an output junction;

said bridge having two parallel branches, including two arms each, that are connected in series between said two main control points;

one arm of said bridge including a transfer diode having an anode coupled to said main positive control junction and having a cathode coupled to said main negative control junction;

said input transfer junction being between the arms of one branch of the bridge and said output transfer junction between the arms of the other branch of the bridge;

means for applying a bias voltage across the main control junctions, whereby a relatively positive voltage is applied to said positive main control junction and a relatively negative voltage is applied to the negative main control junction;

control means having at least two pairs of auxiliary control terminals;

a plurality of control-voltage sources of reversible voltage differentials, each of said control-voltage sources being connected across a different pair of said auxiliary control junctions through control diode means, thereby applying a voltage differential thereacross;

means for actuating each of said control-voltage sources to reverse the voltage differential applied by it, the value of output resistance of each control source being such that when a relatively positive voltage differential is applied by all of said control voltage sources, said control diode means are back biased, thereby closing said gate, and whereby when a relatively negative voltage is applied by at least one of said control voltage sources, current flows through the control diode means connected to at least one of said control-voltage source, thereby opening said gate.

2. An electronic gate unit including:

a quadrilateral bridge having a pair of diagonally opposite main control junctions, one main control junction being positive and the other negative and having a pair of diagonally opposite transfer junctions, one transfer junction being an input junction and the other transfer junction being an output junction;

said bridge having two parallel branches, each branch including two bridge arms that are connected in series between said two main control junctions, the junction between the two arms of one branch forming one transfer junction, the junction between the two arms of the other branch forming the other transfer junction;

a first pair of diodes having their anodes connected to said main positive control junction and their cathodes connected to said input junction and said output junction respectively;

a second pair of diodes having their cathodes connected to said main negative control junction and their anodes connected to said input junction and said output junction respectively;

said gate having two pairs of auxiliary control terminals;

a third pair of diodes having their anodes connected to said positive main control junction and their cathodes connected to one of the auxiliary control terminals of said respective pairs of auxiliary control terminals; and a fourth pair of diodes having their cathodes connected to said negative main control junction and their cathodes connected to the remaining auxiliary control terminals of said respective pairs of control terminals.

3. An electronic gate unit including:

a quadrilateral bridge having a pair of diagonally opposite main control junctions, one main control junction being positive and the other negative and having a pair of diagonally opposite transfer junctions, one transfer junction being an input junction and the other transfer junction being an output junction;

said bridge having two parallel branches, each branch including two bridge arms that are connected in series between said two main control junctions, the junction between the two arms of one branch forming one transfer junction, the junction between the two arms of the other branch forming the other transfer junction;

an impedance element connected in each arm, the impedance element in one arm being in the form of a diode that has its anode and cathode connected respectively to said positive and negative control junction; said gate having two pairs of auxiliary control terminals;

a first pair of diodes having their anodes connected to said positive main control junction and their cathodes connected to one of the auxiliary control terminals of said respective pairs of auxiliary control terminals; and a second pair of diodes having their cathodes connected to said negative main control junction and their cathodes connected to the remaining auxiliary control terminals of said respective pairs of control terminals.

4. An electronic gate unit as defined in claim 2 comprising:

means for applying a bias voltage across the main control junctions whereby a relatively positive voltage is applied to said positive main control junction and a relatively negative voltage is applied to the negative main control junction.

5. An electronic gate unit as defined in claim 2 comprising a pair of bias terminals, and a pair of resistors each having a resistance that is very high compared with the backward resistance of said diodes and each connected between one of said bias terminals and a corresponding one of said main control junctions.

6. An electronic gating unit comprising:

an electronic gate as defined in claim 4;

a plurality of control-voltage sources of reversible voltage differential equal in number to the number of pairs of auxiliary control terminals, each of said control-voltage sources being connected to a different pair of said auxiliary control terminals thereby applying a control voltage thereacross; and means for actuating each of said control-voltage sources to reverse the polarity thereacross, the value of output resistance of each control source being such that when a positive voltage differential is applied by all of said control-voltage sources, no current flows in the forward direction through the control diodes connected between said control-voltage source and said main control junctions thereby opening said gate, and whereby when a relatively negative voltage is applied by at least one of said control-voltage sources, current flows in the forward direction through the control diodes connected to at least one control-voltage source, thereby closing said gate.

7. An electronic gating unit comprising:

a plurality of electronic gating units as defined in claim 4;

a plurality of control-voltage sources of reversible voltage differential equal in number to the number of pairs of auxiliary control terminals of each gate, each of said control-voltage sources being connected to a different pair of said auxiliary control terminals of the respective gates thereby applying a control voltage thereacross; and means for actuating each of control-voltage sources to reverse the polarity thereacross, the value of output resistance of each control source being such that when a positive voltage differential is applied by all of said control-voltage sources, no current flow in the forward direction through the control diodes connected between said control-voltage source and said main control junctions thereby closing said gate, and whereby when a relatively negative voltage is applied by at least one of said control-voltage sources, current flows in the forward direction through the control diodes connected to at least one control-voltage source, thereby opening said gate:

a single communication unit of one kind being connected to all of the transfer junctions of one set; and a plurality of signal communication units of another kind being connected respectively to the transfer junctions of the other set, one kind of signal communication unit being adapted to supply signals for transmission through the gate units and the other kind of communication unit being adapted to receive signals transmitted through the gate unit.

8. An electroniic gating system as defined in claim 6, comprising:

means for operating said control-voltage sources in such a sequence that only one electronic gate is open at a time.

9. An electronic gating system comprising:

a matrix of electronic gates as defined in claim 2, the gates being arranged in rows and columns;

the input transfer junctions of said bridges constituting a first set of transfer junctions and in which the output transfer junctions of said bridges constitute a second set of transfer junctions;

a single signal communication unit of one kind being connected to all of the transfer junctions of one set;

a plurality of signal communication units of another kind being connected respectively to the transfer junctions of the other set, one kind of signal communication unit being adapted to supply signals for transmission through any gating unit to which it is connected, the other kind of communication unit being adapted to receive signals transmitted through the gating unit to which it is connected;

a first commutating control unit having a plurality of control lines equal in number to the number of columns in said matrix and being adapted to provide a reversible-polarity voltage differential on each control line, each control line of said first control unit corresponding to a different column of said matrix and being connected to one pair of control terminals of the gating units in the column to which it corresponds;

a second commutating control unit having a plurality of control lines equal in number to the number of rows in said matrix and being adapted to provide a reversible-polarity voltage differential on each control line, each control line of said second control unit coresponding to a different row of said matrix and being connected to one pair of control terminals of the gating units in the row to which it corresponds;

means for cyclically energizing the lines of said first control unit one at a time, each of said lines when energized removing a negative voltage differential from and applying a positive voltage differential to one pair of control terminals of the gating units that are in the corresponding column; and means controlled in accordance with the condition of one control line of said first control unit for cyclically energizing the lines of said second control unit one at a time, each of said latter lines removing a negative voltage differential from and applying a positive voltage differential to the control terminals of the gating units that are in the corresponding row;

whereby only the one gating unit to which positive differential voltages are applied from both control units is operative at any one time to transmit signals from the input junction to the output junction of said one gating unit.

References Cited in the file of this patent

UNITED STATES PATENTS

| | | |
|---|---|---|
| 2,782,307 | Von Sivers et al. | Feb. 19, 1957 |
| 2,866,103 | Blake | Dec. 23, 1958 |

FOREIGN PATENTS

| | | |
|---|---|---|
| 765,954 | Great Britain | Jan. 16, 1957 |

OTHER REFERENCES

Accurate Linear Bidirectional Diode Gates by Millman and Puckett, Proc. IRE, January 1955; pp. 29–37.